(12) United States Patent  (10) Patent No.: US 6,524,221 B2
Nishimura  (45) Date of Patent: Feb. 25, 2003

(54) VEHICLE TRANSMISSION

(75) Inventor: Nobuyuki Nishimura, Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 23 days.

(21) Appl. No.: 09/808,586

(22) Filed: Mar. 14, 2001

(65) Prior Publication Data

US 2001/0027148 A1 Oct. 4, 2001

(30) Foreign Application Priority Data

Mar. 31, 2000 (JP) ........................................ 2000-101284

(51) Int. Cl.[7] .............................................. F16H 59/60
(52) U.S. Cl. ......................................... 477/97; 477/900
(58) Field of Search ............................. 477/75–97, 900; 180/14.6, 290

(56) References Cited

U.S. PATENT DOCUMENTS

| 4,850,249 A | * | 7/1989 | Kirstein | 180/14.6 |
| 4,854,194 A | * | 8/1989 | Kaneko et al. | 477/900 |
| 5,678,453 A | * | 10/1997 | Dresden, III | 477/900 |
| 5,761,628 A | | 6/1998 | Steeby | 701/64 |
| 5,984,828 A | | 11/1999 | Huber | 477/78 |

FOREIGN PATENT DOCUMENTS

| DE | 29 52 204 A1 | 6/1981 |
| DE | 198 39 837 A1 | 3/2000 |
| EP | 0 681 121 A2 | 11/1995 |
| EP | 0 787 930 A2 | 8/1997 |
| JP | 7-208590 | 8/1995 |

* cited by examiner

Primary Examiner—Jack Lavinder
Assistant Examiner—C. T. Bartz
(74) Attorney, Agent, or Firm—McCormick, Paulding & Huber LLP

(57) ABSTRACT

A vehicle transmission (302) is equipped with an actuator (306) for shifting the transmission and a controller (306) for issuing a command to the actuator (306), to control a shifting operation of the transmission (302). A vehicle speed sensor (305) detects a speed of a vehicle, and a gear position sensor detects a current gear position of the transmission (302). The controller (306) stores at least two start gears higher a lowest gear of the transmission beforehand, and selects one start gear when starting a vehicle. The controller (306) selects the start gear based on whether the vehicle tows another vehicle or not.

11 Claims, 7 Drawing Sheets

FIG. 5
| SPLITTER | MAIN GEAR | RANGE GEAR | SYNTHETIC GEAR |
|---|---|---|---|
| L | 1st | L | 1st |
| H | 1st | L | 2nd |
| L | 1st | H | 9th |
| H | 1st | H | 10th |
FIG. 6
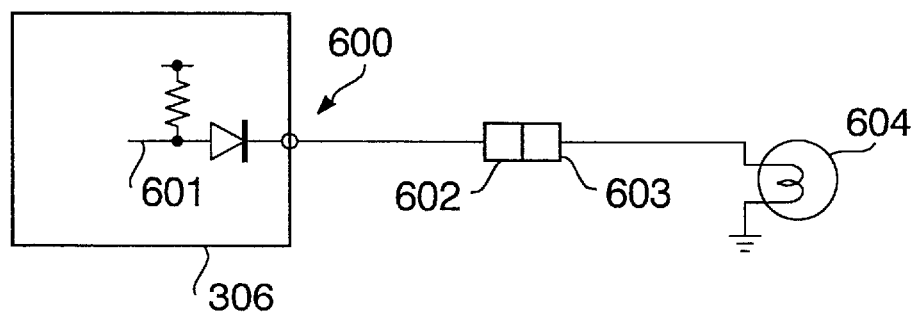
FIG. 7
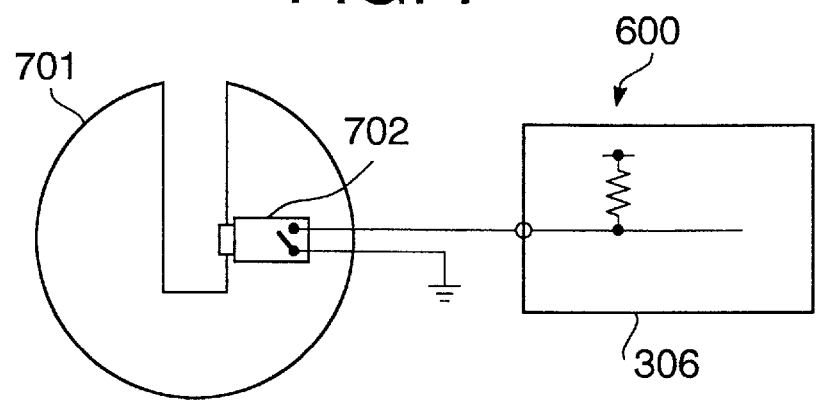

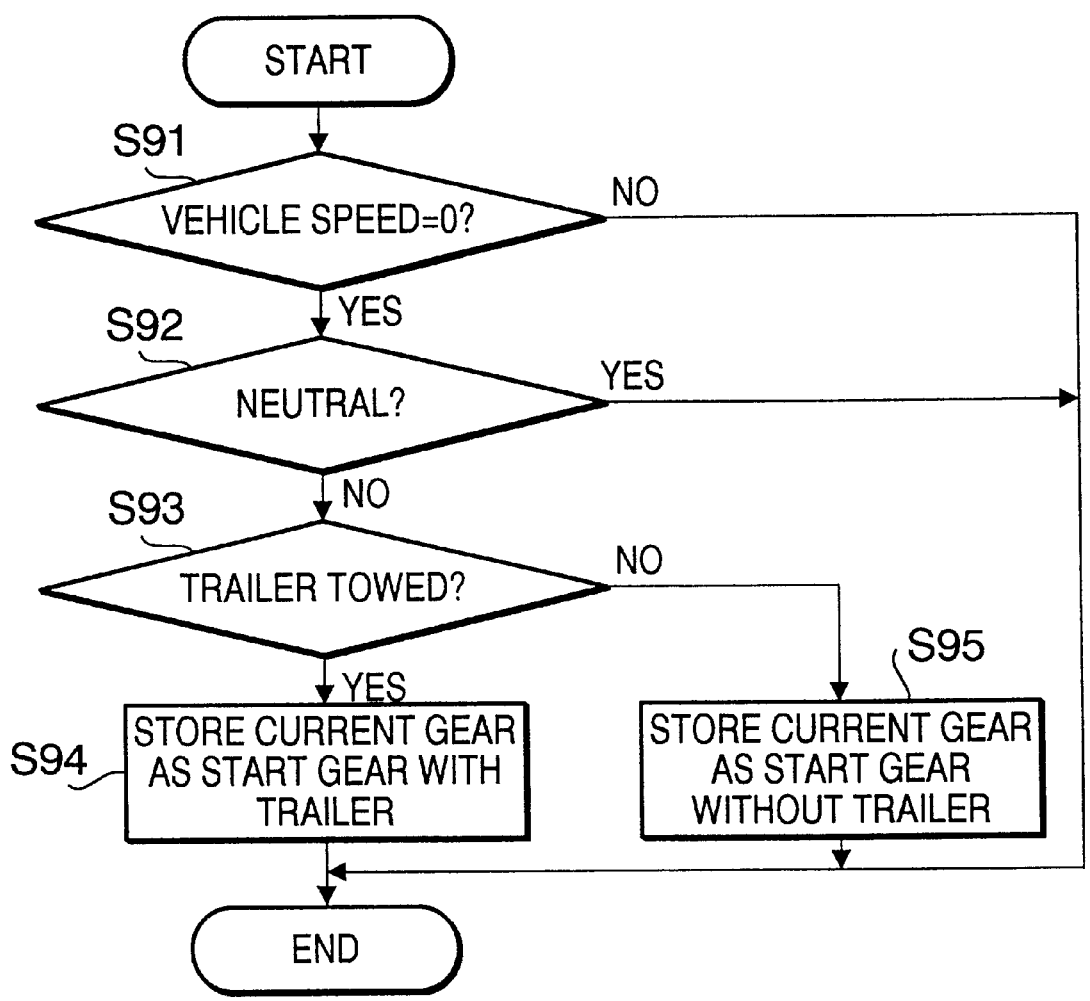

VEHICLE TRANSMISSION

CROSS REFERENCES TO RELATED APPLICATION

This application claims priority under 35 USC 119 of Japanese Patent Application No. 2000-101284 filed on Mar. 31, 2000, the entire disclosure of which is incorporated herein by reference.

BACKGROUND OF THE INVENTION

1. Field of the Invention

The present invention generally relates to a vehicle transmission that is shifted by an actuator, and more particularly to a transmission that realizes smooth and comfortable starting of a vehicle.

2. Description of the Related Art

A total weight and load of large trucks such as tractor-trailer greatly differs from when the tractor does not tow a trailer (or the trailer is empty and carries no load) to when the tractor tows a fully-loaded trailer. In order to maintain a satisfactory engine running condition and allow a driver to drive a vehicle comfortably in any situations, a large truck has a considerably greater number of gear positions than a small truck (e.g., pick-up truck). For example, the large truck is equipped with a four-gear main gear assembly, a two-gear splitter gear assembly of relatively small gear ratio in front of the main gear assembly, and a two-gear range gear assembly of relatively large gear ratio behind the main gear assembly. The combination of the splitter gear assembly, main gear assembly and range gear assembly provides sixteen gear positions as a whole. By employing such large-number-gear transmission, a driver can select a suitable gear so that an appropriate engine condition is obtained across a wide range of vehicle speed. Further, the driver can accelerate and decelerate the vehicle smoothly.

Gear position change is effected by an actuator under the control of an associated controller. However, initiation of the gear position change is effected by either automatically under the control of the controller or manually. The driver can momentarily tilt a shift lever to the front and back from a D position or range (=H position), which is a stable driving gear position. In the manual shift mode, if the driver moves the shift lever forward from the H position, the controller recognizes that the driver wants to shift up the transmission, and if the driver moves the shift lever backward, the controller assumes that the driver intends to shift down the transmission. Subsequently, the controller shifts up or down the transmission from a current gear position. By repeating this shift up (or down) operation, the transmission gear position is gradually raised (or lowered). If the driver keeps the shift lever in the H position, the current gear position is maintained. In the automatic shift mode, the driver does not have to move the shift lever; instead, even if the shift lever remains in the D position, the controller selects a most appropriate gear position based on an engine running condition and/or vehicle speed and automatically effects the shifting up or down.

Although the transmission has sixteen gears, all the gears from the first to sixteenth are not used during driving. Some of the gears may be frequently utilized depending upon. vehicle load condition, driver's intention, etc. For instance, when a large truck with a trailer starts moving, a very low gear position such as first or second gear is generally selected if the trailer carries a relatively heavy load. On the other hand, if the load is not so heavy, a relatively high gear position such as fourth, fifth or sixth gear may be selected. In the latter case, the tractor-trailer can smoothly start and accelerate with the relatively high gear, and the driver can experience comfortable starting. Further, since clutch dis-engagement and engagement take place less frequently as compared with the former case, clutch wear is reduced and its life is elongated. If the tractor does not tow the trailer, a still higher gear such as ninth gear may be selected to experience comfortable starting. The first or second gear may be selected in a particular situation, e.g., when the vehicle starts on an uphill, when an engine torque should be raised because of low atmospheric pressure in mountains, or when the driver should operate the vehicle delicately at a low speed to park in a garage.

In order to start the large truck having sixteen gear positions smoothly, a gear for starting should be selected appropriately based on a vehicle load, road condition, driver's intention, atmospheric condition, etc. However, the shift lever only allows shifting up and down so that the first gear is always selected in every initial setting and the shift lever operation must be repeated until a desired start gear is reached. Thus, the driver is required to tilt the shift lever repeatedly every time the driver wants to start the vehicle from a stop condition. This is troublesome and a certain period is needed until the vehicle starts, thereby degrading driving comfort.

To solve the above described problem, Japanese Patent Application, Laid Open Publication No. 7-208590 published on Aug. 11, 1995 and entitled "Gear Position Selection Circuit For Use In Semi-Automatic Transmission" discloses an arrangement for a tractor-trailer that has a relay connected in series to a key switch and is activated by a trailer pick-up switch which is pneumatically activated by a brake system of the trailer. The relaying operation of the relay determines whether the trailer is towed or not. If a tractor tows the trailer, the transmission is shifted from the first gear to a desired gear successively (gear by gear). If no trailer is pulled, the initial shift up operation made by a driver selects a certain gear higher the first gear, and then the transmission is shifted from that gear successively. It should be remembered here that when the tractor pulls the trailer with a relatively light load, the driver generally wants to start the vehicle at the fourth, fifth or sixth gear. According to the above-mentioned Japanese Patent Publication No. 7-208590, however, the first gear is always selected at the beginning as far as the vehicle pulls the trailer. Further, even if the vehicle does not pull the trailer, the driver has to conduct the first shift up operation to skip. over to a certain gear before reaching a desired gear. Moreover, at least four signal lines are required for the relay in order to determine whether the vehicle tows the trailer or not. It should be noted that there is crowded wiring near the key switch in any vehicle, so that additional wiring. (at least four additional lines) makes the arrangement complicated.

SUMMARY OF THE INVENTION

One of the objects of the present invention is to provide an arrangement for a multi-gear transmission that can solve the above problems.

According to one aspect of the present invention, there is provided an apparatus for use with a transmission equipped with an actuator for shifting the transmission and a first contoller for issuing a command to the actuator to control a shifting operation of the transmission, the apparatus including a second controller for selecting one start gear, higher a lowest gear of the transmission, from a plurality of predetermined start gears when starting a vehicle. With this apparatus, if a driver moves a shift lever to a D position, a start gear is automatically selected.

The second controller may select one start gear from two, based on whether the vehicle tows another vehicle or not. The apparatus may further include a sensor for detecting the trailing vehicle, and the second controller may select a single start gear from the two candidates based on detection result from the sensor. The sensor may determine whether there is a trailing vehicle or not based on change in voltage or current of a signal issued to the trailing vehicle from the leading vehicle to illuminate a brake lamp of the trailing vehicle. The sensor may be a contact type or optical type switch mounted on the leading vehicle, and the trailing vehicle is mechanically coupled with the leading vehicle such that a certain portion of the trailing vehicle touches the switch when the trailing vehicle is towed by the leading vehicle. A driver may be able to decide the predetermined start gears.

Additional objects, aspects and advantages of the present invention will become apparent to those skilled in the art to which the invention relates from the subsequent detailed description of the invention and appended claims taken in conjunction with the accompanying drawings.

BRIEF DESCRIPTION OF THE DRAWINGS

FIG. 5 illustrates a table of gear combination of the transmission;

FIG. 6 schematically illustrates a trailer detector;

FIG. 7 illustrates a modified trailer detector;

FIG. 9 illustrates another flowchart for preparing the two start gears used in FIG. 1.

DETAILED DESCRIPTION OF THE INVENTION

Now, embodiments of the present invention will be described in reference to the accompanying drawings.

Figure 1:
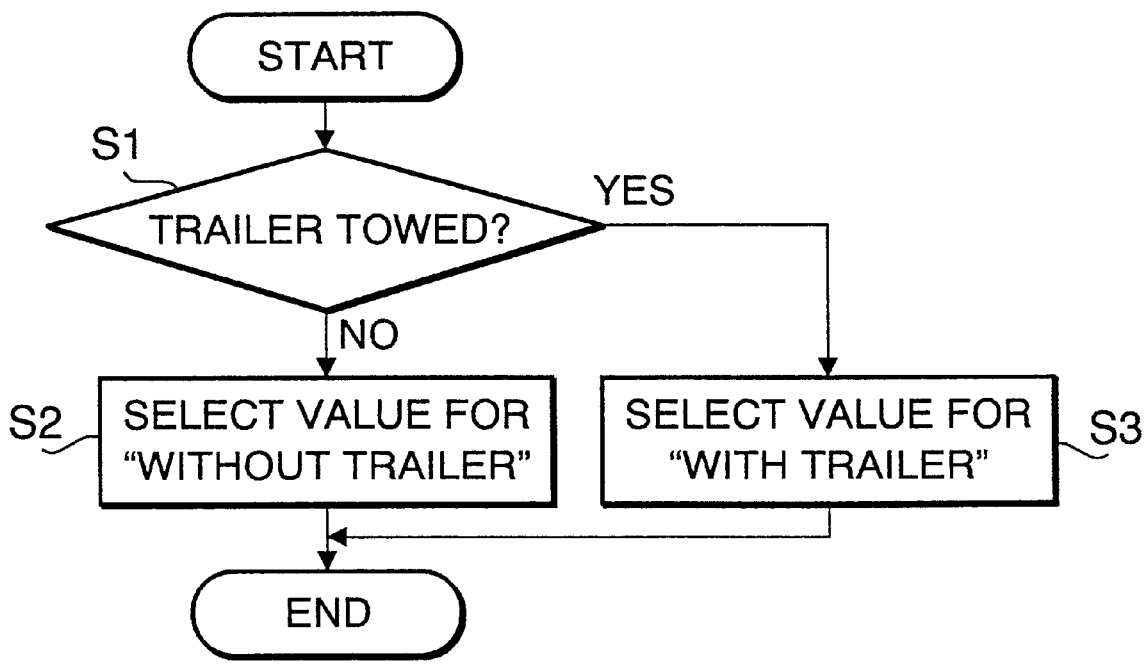
FIG. 1 illustrates a flowchart for selecting one start gear from two candidates according to the present invention.

A transmission of the present invention is equipped with a controller that causes an actuator to shift the transmission in response to shift up and down movements of a shift lever made by a driver. The transmission further possesses a start gear determination function as illustrated in FIG. 1 and a start gear candidate preparation function shown in FIG. 2 or 9. The latter function prepares a plurality of start gear candidates, from which one start gear is selected by the function of FIG. 1. The present invention is preferably applied to a tractor-trailer with a diesel engine and multi-gear transmission, and such tractor-trailer will be described below. The tractor further possesses an automatic clutch mechanism for disengaging and engaging a clutch with a clutch actuator under the control of a controller, and a manual clutch disengagement and engagement mechanism that is effected upon stamping and releasing of a clutch pedal.

Figure 3:
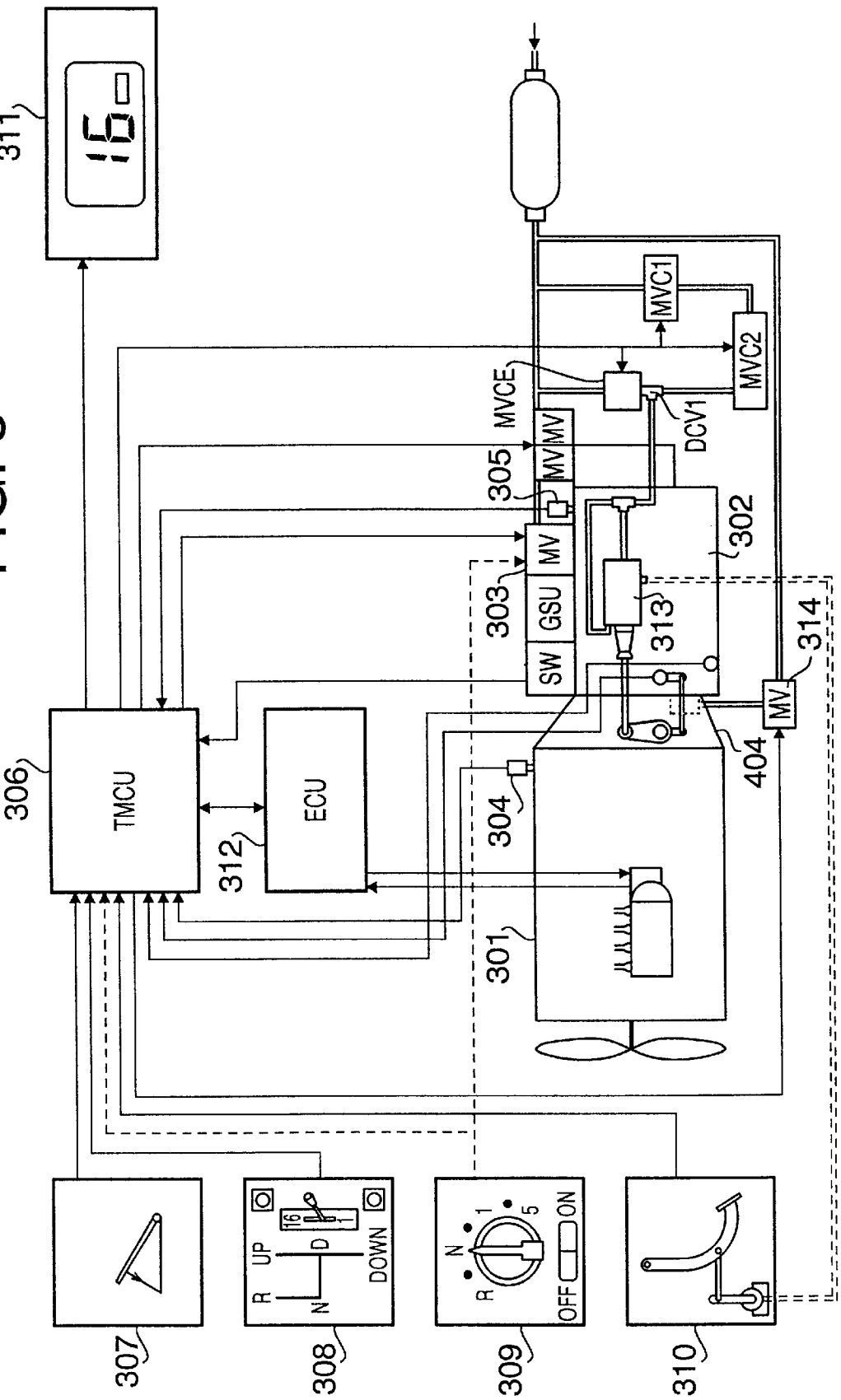
FIG. 3 illustrates an engine drive mechanism incorporating a transmission arrangement of the present invention.

Referring to FIG. 3, an engine drive system includes the transmission 302 connected to an engine 301 via a clutch 404, a pneumatic cylinder unit 303 which serves as an actuator of the transmission 302, an engine revolution speed sensor 304 for detecting engine rotations, an output shaft rotation speed sensor 305 for detecting rotation speed of an output shaft of the transmission 302 as a vehicle speed, a controller (transmission control unit: TMCU) 306 for executing a control logic related to transmission gear position change, an accelerator sensor 307 for detecting depression of an accelerator pedal and converting it to an accelerator opening degree, a shift lever unit 308 for transmitting a shifting operation made by a driver to the controller, an automatic/manual (A/M) selection switch (not shown) for shift mode switching between a manual mode and an automatic mode, an emergency gear position switch 309 for selecting a certain gear in a special occasion such as in an emergency situation, a clutch pedal 310 for disengaging and engaging the clutch manually, a brake sensor (not shown) for detecting shallow depression of a brake pedal, a trailer socket 602 (FIG. 6) provided at a rear of the tractor for transmitting a trailer brake lamp illumination signal to the trailer, a trailer detector 600 (FIG. 6 or 7) for determining whether the trailer is towed by the tractor, a gear position detector (not shown) for detecting a current gear position, and a gear position indicator 311 for indicating the current gear in a console or meter panel unit in front of a driver. Another controller (engine control unit: ECU) 312 executes a control logic related to the engine operation such as timing and amount of fuel injection. A clutch actuator 313 is driven by an electromagnetic valve (MV) 314 for automatically disengaging and engaging the clutch. The controller 306 receives signals indicative of vehicle running conditions from the engine revolution speed sensor 304, output shaft rotation sensor 305 and other sensors and detectors, and then refers to shift down and up maps which are stored beforehand in its memory to retrieve necessary data. Further, the controller 306 is able to execute and/or control various functions and operations at certain time intervals such as several-ten milliseconds by multiple timer interruption. The transmission controller 306 is connected to the engine control unit 312 by a bus or the like so that it can communicate with the engine control unit 312. The shift lever unit 308 has a rear (R), neutral (N), drive (D) or hold (H), shift up (UP) and 'shift down (DOWN) positions. The R, N, D, and H positions are stable or stationary positions, and the UP and DOWN positions are momentary or instantaneous positions. The shift lever 308 also has the A/M switch at the top of a lever stem. Reference symbol MVC1 designates an electromagnetic valve for maintaining air pressure, MVC2 a clutch proportion valve, and MVCE another electromagnetic valve for emergency. More detail of the engine drive system shown in FIG. 3 can be found in Japanese Patent Application No. 2000-63337 or corresponding U.S. Patent Application Ser. No. 09/794,780, filed on Feb. 27, 2001, entitled "ENGINE OVERRUN PREVENTION SYSTEM FOR AUTOMATIC TRANSMISSION", the entire disclosures of which are incorporated herein by reference.

Figure 4:
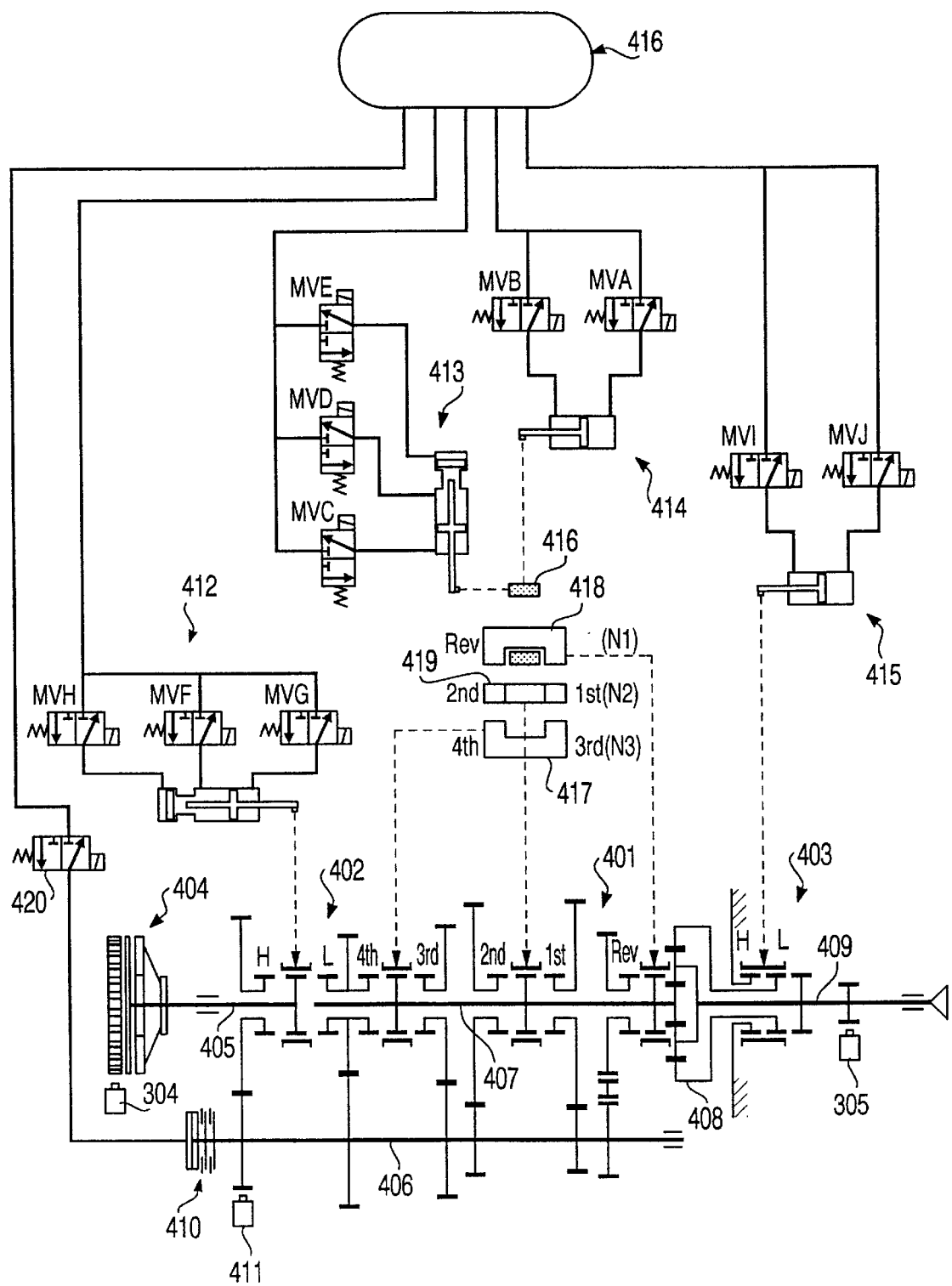
FIG. 4 illustrates the detail of the transmission and associated pneumatic cylinders used in the arrangement shown in FIG. 3.

Referring to FIG. 4, the detail of the transmission 302 and pneumatic cylinders will be described.

The transmission 302 includes a four-gear main gear assembly 401, a splitter assembly 402 with relatively small gear ratio in front of the main gear assembly 401, and a range gear assembly 403 with relatively large gear ratio behind the main gear assembly 401. The splitter assembly 402 has three positions, namely, a high gear (H), low gear (L) and neutral. Rotations of an input shaft 405 transferred from a driven plate in the clutch 404 are further transferred to a countershaft 406 at the gear ratio H or L through the splitter assembly 402 or interrupted by the splitter assembly 402. The main gear assembly 401 has six positions, namely first ($1^{st}$), second ($2^{nd}$), third ($3^{rd}$), fourth ($4^{th}$), reverse (Rev) and neutral positions. When the splitter 402 is in its L position, a dog gear rotated by the input shaft 405 engages with a sleeve slid by the pneumatic cylinder unit 303 and its rotation is transmitted to a main shaft 407. When the splitter 402 is in its H position, another dog gear integral with a main gear in mesh with a counter gear integral with the counter shaft 406 engages with a sleeve and rotation of the dog gear is transmitted to the main shaft 407 at a different gear ratio. Thus, the rotations of the countershaft 406 are transferred to the main shaft 407 at four gear ratios in the same rotational direction for forward movement or one gear ratio in the opposite rotational direction for backward movement through the main gear assembly 401 or interrupted by the main gear assembly. The range gear assembly 403 includes a planetary gear mechanism 408. Specifically, it includes a sun gear secured on the main shaft 407, a plurality of planetary gears around the sun gear, a carrier secured to the output shaft 409 for supporting the planetary gears, and a ring gear around the planetary gears. A spline on a housing or a spline on the output shaft is coupled with the ring gear to transfer the rotations of the main shaft 407 to the output shaft 409 at the gear ratio of H or L.

A countershaft brake 410 is provided for braking the countershaft 406. A sensor 411 detects the countershaft rotation speed. The countershaft brake 410 and countershaft rotation speed sensor 411 are used to synchronize the rotation of a dog gear on the main shaft 407 with that of a sleeve. In other words, since an electronic synchronization control is conducted without mechanical synchronization units in the illustrated embodiment, the countershaft brake 410 is turned on to lower the dog gear rotation speed when the sleeve rotation speed calculated from an output of the output shaft rotation sensor 305 is smaller than the dog gear rotation speed calculated from an output of the countershaft rotation sensor 411. When the rotation speed of the output shaft substantially matches that of the countershaft, the sleeve is engaged.

The pneumatic cylinder unit includes a splitter cylinder 412 stroke-controlled by three electromagnetic valves, a select cylinder 413 stroke-controlled by three electromagnetic valves, a sleeve shift cylinder 414 stroke-controlled by two electromagnetic valves, a range cylinder 415 stroke-controlled by two electromagnetic valves, and the countershaft brake 410 on/off-controlled by a single electromagnetic valve 420. These electromagnetic valves are cooperatively or selectively operated to switch and selectively actuate various parts of the transmission. Pneumatic pressure is supplied from an air tank 416. More detail of the transmission and pneumatic cylinders shown in FIG. 4 can also be found in the above-mentioned Japanese Patent Application No. 2000-63337 or corresponding U.S. patent application Ser. No. 09/794,780, filed Feb. 27, 2001, entitled "ENGINE OVERRUN PREVENTION SYSTEM FOR AUTOMATIC TRANSMISSION".

The splitter cylinder 412 includes an electromagnetic valve MVH connected to a bottom of the cylinder, an electromagnetic valve MVF connected to a body of the cylinder and an electromagnetic valve MVG connected to a top of the cylinder. The cylinder body receives a head with two rods extending in opposite directions. Another head having no rod is received in the cylinder bottom.

When the electromagnetic valve MVF is only actuated, the right head is caused to move toward the cylinder top (toward the right in the drawing). As a result, the splitter sleeve of the splitter 402 operatively connected to the right rod moves to the L position. When the electromagnetic valve MVG is only actuated, the right head is moved toward the cylinder bottom so that the splitter sleeve is brought into the H position. When the two electromagnetic valves MVG and MVH are activated, the left head moves to the right, and the right head moves to the left until the left rod of the right head abuts the left head and the right head stops at a mid position. This causes the splitter sleeve to stay in the neutral position.

The select cylinder 413 has an electromagnetic valve MVE connected to a bottom of the cylinder, an electromagnetic valve MVD connected to a body of the cylinder and an electromagnetic valve MVC connected to a top of the cylinder. A first head with rods extending in opposite directions is received in the cylinder body and a second rod without rod is received in the cylinder bottom.

When the electromagnetic valve MVD is only actuated, the first head moves toward the cylinder top so that the selector 416 connected to the projecting rod moves to the N3 position of the shifter 417. From the N3 position, the main gear assembly 401 can be shifted into the third or fourth gear position. When the electromagnetic valve MWC is only actuated, the first head moves toward the cylinder bottom so that the selector 416 moves to the N1 position of the shifter 418. From the N1 position, the main gear assembly 401 can be shifted to the reverse position. When the two electromagnetic valves MVC and MVE are actuated, the second head moves toward the cylinder body and the first head moves toward the cylinder bottom until the rod thereof abuts the second head and the first head stops at a mid position. Therefore, the selector 416 stops at the N2 position of the shifter 419. From the N2 position, the main gear assembly 401 can be shifted to the first or second gear position.

The sleeve shift cylinder 414 includes an electromagnetic valve MVB connected to a top of the cylinder and an electromagnetic valve MVA connected to a bottom of the cylinder. A head having a rod is received in a body of the cylinder.

When the electromagnetic valve MVA is only activated, the head moves toward the cylinder head so that the selector 416 connected to the rod moves to the left in the drawing (toward the group of the reverse, second and fourth gear positions of the shifters 417, 419 and 418). When the electromagnetic valve MVB is only activated, on the other hand, the head moves toward the cylinder bottom so that the selector 416 connected to the rod moves to the right (toward the group of the first and third gear positions). When the electromagnetic valves MVA and MVB are both activated, the head is brought into a neutral position and the selector 416 takes a neutral position.

The shifters 417, 419 and 418 are operatively connected to the associated sleeves of the main. gear assembly 401. Thus, if the select cylinder 413 causes the selector 416 to move into the N1, N2 or N3 position and the sleeve shift cylinder 414 causes the selector 416 to move, a desired sleeve engages with a desired dog gear and the main gear assembly 401 is shifted to its first, second, third, fourth or reverse gear position. Further, if the selector 416 is brought into the neutral condition, the main gear assembly 401 becomes neutral.

The cylinder 415 for the range gear assembly includes an electromagnetic valve MVI connected to a top of the cylinder and an electromagnetic valve MVJ connected to a bottom of the cylinder. A head having a rod is received in a body of the cylinder.

When the electromagnetic valve MVI is only activated, the head is moved toward the cylinder bottom so that the range sleeve of the range gear assembly 403 connected to the rod is moved to the H position. When the electromagnetic valve MVJ is only activated, the head is moved toward the cylinder head so that the range sleeve is moved to the L position.

By selectively turning on and off the above described electromagnetic valves of the pneumatic cylinder arrangement, it is possible to switch the multi-stage transmission 401 among eighteen gear positions (sixteen forward positions and two backward positions). In addition, two kinds of neutral position, namely the splitter neutral and the main gear neutral, are obtained.

The gear position detector detects a current gear position from the conditions (turning on or off) of the electromagnetic valves controlled in the above described manner. Alternatively, a sensor may be attached to each of the pneumatic cylinders to detect a cylinder rod stroke and indirectly determine the current gear from outputs of such sensors.

Figure 8:
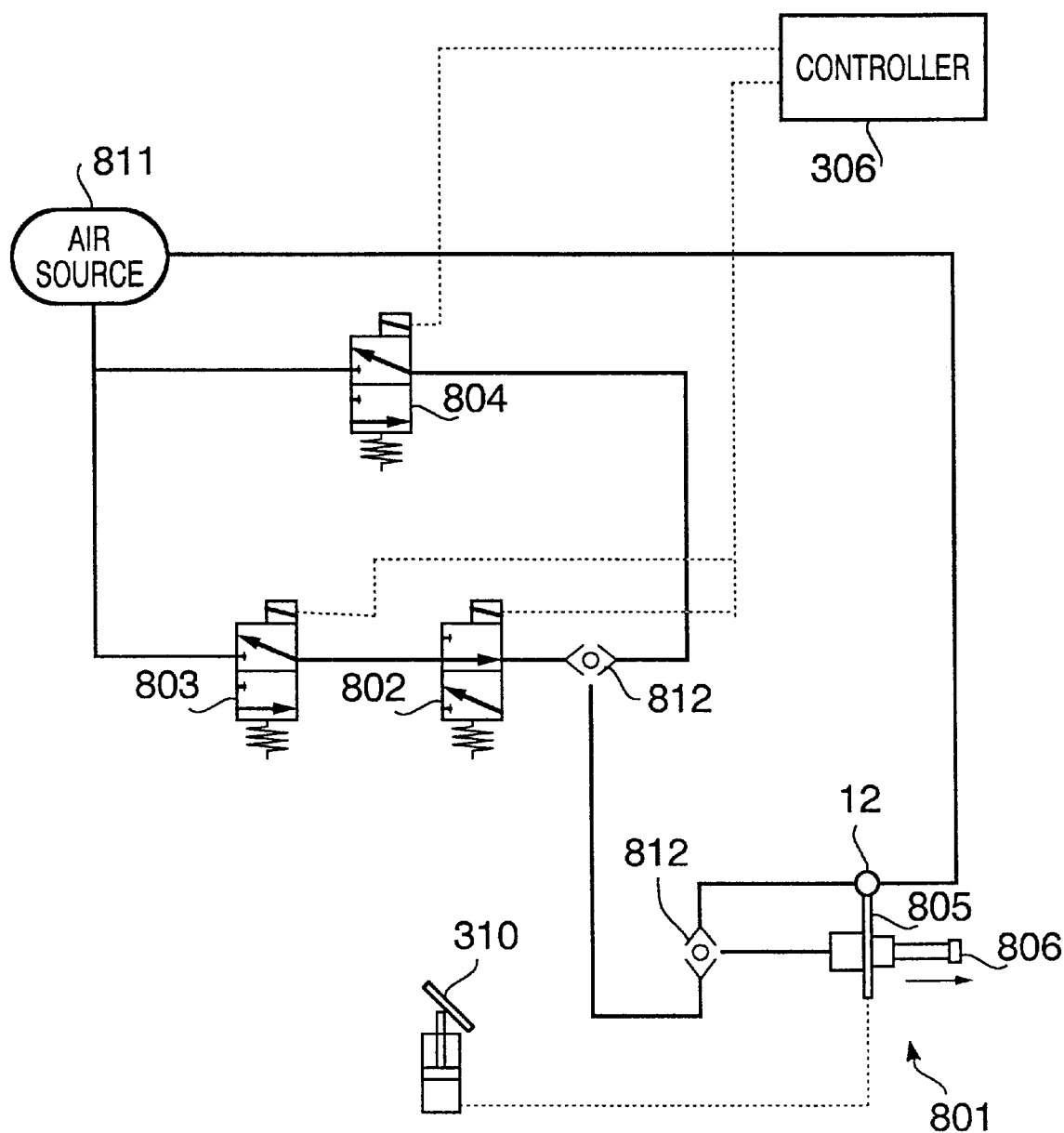
FIG. 8 schematically illustrates a clutch actuator used in the arrangement shown in FIG. 3.

Referring now to FIG. 8, the clutch actuator and related elements will be described.

A clutch booster 801 serves as the clutch actuator 313 in this embodiment. The stroke of the dutch booster 801 is adjusted or changed by air pressure fed from a proportional valve 802. An on/off valve 803 is provided upstream of the proportional valve 802 for blocking up the air application. An emergency valve 804 is provided for forcibly disengaging the clutch. A clutch pedal 310 hydraulically actuates a relay piston 805 of the clutch booster 801. Reference numeral 811 designates an air pressure source, and 812 a double check valve. The clutch booster 801 causes an element 806 to move in proportion to the amount of air fed thereto. The element 806 is connected to the pressure plate of the clutch 404.

Upon turning on of the main power source by a key switch of the vehicle, the controller 306 turns on the on/off valve 803 to feed the air pressure to the proportional valve 802. When the power source is turned off, the on/off valve 803 is also turned off so as to prevent the pressure drop due to escape of the air through the proportional valve 802. When the clutch is disengaged and engaged, the controller 306 gives a control current to the proportional valve 802. The proportional valve 802 feeds the air to the clutch booster 801 in proportion to the current, so that a clutch position is controllable between a full disengaged position and a full engaged position by the current. Therefore, a delicate control for half-engaged condition of the clutch is executable by the controller 306. The emergency valve 804 can suddenly disengage the clutch 404 so that it is used to prevent sudden starting of the vehicle. This valve is useful when particular part(s) of the apparatus malfunction(s). Turning on and off of the emergency valve 804 is made by a command issued from the controller 306, or made by a driver manually operating an emergency switch (not shown). As the clutch pedal 310 is stamped, the resulting hydraulic pressure causes the element 806 to move and the relay piston 805 to move, thereby feeding the air to the clutch booster 801. This promotes movement of the member 806.

Referring to FIG. 5, depicted is a table of several gear combinations of the transmission 302 having sixteen gear positions, i.e., how the splitter assembly 402, main gear assembly 401 and range gear assembly 403 are combined to provide a synthetic gear (gear position of the transmission 302 as a whole). If the main gear assembly 401 is set to its first gear, the range gear assembly 403 is set to its L position, and the splitter assembly 402 is set to its L or H position, then the first or second gear among the sixteen gears of the transmission is obtained. If the main gear assembly 401 is set to its first gear, the range gear assembly 403 is set to its H position, and the splitter gear 402 is set to its L or H position, then the ninth or tenth gear among the sixteen gears is obtained. Other combinations are not illustrated, but it is apparent that if other gear positions of the main gear assembly 401 are utilized, the third to eighth and eleventh to sixteenth gears are obtained.

Referring to FIG. 6, illustrated is the trailer detector 600. When the tractor tows the trailer, it is necessary to turn on a brake lamp at the rear of the trailer upon stamping a brake pedal. Thus, a trailer brake lamp illumination signal 601 should be sent to the trailer from the tractor. For this reason, a trailer socket 602 is provided at the rear of the tractor. As a plug 603 extending from the trailer is coupled with the trailer socket 602, the trailer brake lamp signal 601 can reach a trailer brake lamp 604. The trailer detector 600 located in the controller 306 that outputs the trailer brake signal 601 determines whether trailer is towed or not based on voltage drop or current of the brake lamp signal 601. It should be noted that the trailer detector may be located in another controller adapted to control other lamps. If the plug 603 is not coupled with the socket 602, the brake lamp signal 601 maintains the same voltage as the power source of the controller 306 and no current flows.

The trailer detector 600 may be modified as illustrated in FIG. 7. Specifically, since a trailer front portion (not shown) is mechanically engaged with the tractor rear portion 701, a contact type or optical type switch 702 is provided on the tractor rear portion 701 to detect the trailer front portion, and on/off of this switch 702 is sent to the trailer detector 600 in the controller 306 to determine if connection is established between the trailer and tractor. If the switch 702 is turned on, a signal of ground voltage is fed to the controller 306. If the switch 702 is turned off, a signal of the same voltage as the power source of the controller 306 is sent to the controller 306.

In this manner, attachment and non-attachment of the trailer to the tractor is detected by the trailer detector 600 so that the driver does not have to pay attention to presence of the trailer behind the tractor. The driver does not have to input any signal indicative of presence or absence of another vehicle to the controller by operating a switch or the like. This lightens the deliver's burden and reduces a chance of making mistakes. Since the trailer detector of FIG. 6 is situated inside the controller 306 and only required to monitor the trailer brake lamp signal 601, special and additional electrical and/or electronic parts and wiring are not needed. The trailer detector of FIG. 7 only requires the switch 702 as the additional electrical/electronic part. The switch 702 can directly be connected to the controller 306 so that the wiring is not complicated.

Now, a gear for the starting of the vehicle (start gear) will be described in detail in reference to FIG. 1.

When the shift lever 308 is moved from the N position to the D position, the controller 306 recognizes that the driver wants to start the vehicle. Prior to starting of the vehicle, the controller executes the flowchart of FIG. 1. Specifically, at step S1 it is determined whether the trailer is towed or not, based on the detection result from the trailer sensor 600. If the trailer is towed, the program proceeds to S3 to select an appropriate gear for such situation, such as the $4^{th}$ gear. If no trailer is towed, the program proceeds to S2 and selects, for example, the 9th gear. The gear position selected at S2 or S3 is used as the initial value for the transmission 302 when the transmission actuator shifts the transmission 302 at the time of starting of the vehicle.

The gear positions at S2 and S3 are prepared beforehand. The driver can decide which gear position among the sixteen should be selected at S2 and S3, and the controller 306 memorizes them. Accordingly, when the driver starts the vehicle, the driver is only required to tilt the shift lever 308 to the D position; the driver does not have to conduct the shift up (or down) operation at all. Thus, the moving off operation of the vehicle is considerably simplified. Further, since frequency of clutch disengagement and engagement is reduced as compared with the conventional arrangement that requires successive (gear by gear) shifting from the first gear, the clutch wear is reduced and clutch life is elongated.

How the gear positions for S2 and S3 are decided and memorized will be described in reference to FIG. 9.

First, at S91 it is determined whether the vehicle speed is zero or not, using the output shaft rotation sensor 305. This determines whether the vehicle is stopped or not. If the vehicle is not stopped, the start gear determination is not necessary. Accordingly, the program goes to END. If the vehicle is stopped, there is a possibility that the vehicle is in the stand-by condition for starting. Therefore, the program proceeds to S92.

At S92, it is determined whether the synthetic gear position of the transmission 302 is neutral or not. If it is neutral, the vehicle is not in the stand-by condition for starting. Thus, the start gear determination is unnecessary and the program proceeds to END. If the synthetic gear position of the transmission is other than neutral, it means that a certain gear has been selected by the driver. The driver has shifted up or down the transmission to this gear position while the vehicle is stopping.

At the next step (S93), it is determined whether the trailer is towed or not. If the trailer is towed, the current gear position detected by the gear position sensor is stored as the start gear for the "trailer-towed" condition (S94). This start gear is used in step S3 in FIG. 1. If the trailer is not towed, the detected current gear position is stored as the start gear for the "no-trailer" condition (S95) for the step S2 in FIG. 1.

Once the start gears for S2 and S3 are stored in the controller in this manner, one of them is automatically selected according to the flowchart of FIG. 1 when starting the vehicle.

Figure 2:
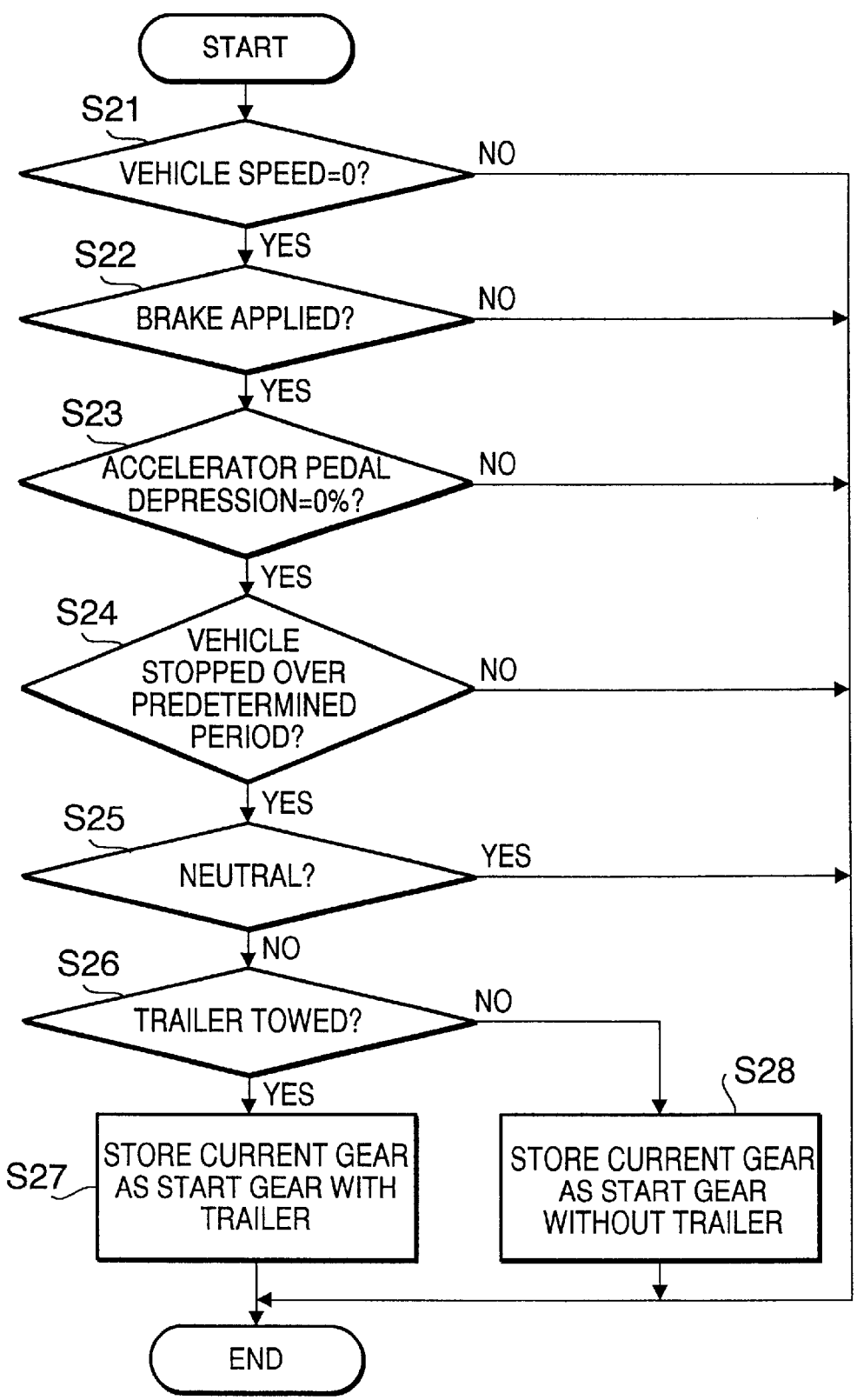
FIG. 2 illustrates a flowchart for preparing the two start gear candidates used in FIG. 1 by a learning process.

Another process for preparing the two start gear positions by a learning process under particular conditions will be described in reference to FIG. 2.

First, it is determined at S21 whether the vehicle speed is zero km/n or not based on the output of the output shaft rotation sensor 305. This confirms that the vehicle stands still. If the vehicle is not stopped, a current situation is not related to selection of a start gear so that no learning is effected. If the vehicle is stopped, there is a possibility that a driver wants to start the vehicle. Thus, the program proceeds to the next step (S22).

At S22, it is determined whether the brake pedal is stamped based on a signal from the brake sensor. If the answer is no, the learning is not effected. It should be noted, however, that this step does not determine in effect whether the brake is working, but whether the driver wants the start gear learning process to start. In other words, the brake sensor signal is a request for the learning. If the brake sensor is not used for this purpose, a separate learning start switch may be provided. In such case, the learning is conducted only when the driver turns on the switch. Use of the brake sensor is advantageous since the number of parts is reduced.

Next, it is determined at S23 whether the accelerator opening (i.e., accelerator pedal depression) is 0%. This checks if the accelerator pedal is not depressed. If the vehicle speed is 0 km/h and the brake sensor is turned on but the accelerator pedal is stamped, it is assumed that the vehicle is on a non-flat road such as uphill. In such case, the learning is not effected. On the other hand, if the accelerator pedal is not stamped, the program proceeds to S24.

At S24 it is determined whether a predetermined period has elapsed since the vehicle stopped. The predetermined period may be 1.5 seconds. This is because there is no need to relearn the start gear if the vehicle is forced to stop just temporarily, e.g., at a stop line or railway crossing. If the answer is no, the program proceeds to END. If the predetermined period has elapsed, on the other hand, there is a possibility that the start gear learning is needed. Then, the program proceeds to S25. It should be noted, however, that if the vehicle is forced to stop at a red traffic light, or on its way turning to the left or right, or in front of a crosswalk over the predetermined period, the driver may release the brake pedal or move the shift lever to the neutral position. This terminates the learning process. If the vehicle is parked, the driver may soon release the brake pedal or move the shift lever to the neutral position. This also prevents execution of unnecessary learning. On the other hand, if the driver wants to perform the learning process to find out a different start gear after stoppage of the predetermined period, he or she slightly stamps the brake pedal to request the learning.

At the next step S25, it is determined whether the synthetic gear position of the transmission 302 is the neutral or not. If neutral, the vehicle is not in a start stand-by condition so that the learning is not conducted. If not neutral, a certain gear has been selected, and that gear is memorized as the start gear. It should be noted that instead of determining neutral or not, S25 may determine whether the actuator is in the process of shifting. If the actuator completes the shifting operation, a certain gear has been selected for the starting.

If all the conditions above are met, the start gear is learnt. In sum, when the vehicles is. stopped, the brake pedal is stamped, the accelerator pedal is not depressed, the predetermined period has elapsed after stoppage of the vehicle and the synthetic gear of the transmission is not the neutral, then the start gear learning is effected. Because of this, the start gear learning is conducted only when the driver wants so. The start gear in an unusual situation is not learnt, and further the start gear learning is not permitted even if in a normal situation as far as the driver does not want so. Accordingly, a start gear is memorized according to the driver's intention or desire, and the driver can restart the vehicle comfortably. If the vehicle is in a traffic jam on an uphill, the brake pedal is stamped prior to stamping the accelerator pedal to start the vehicle so that the learning is triggered. For the next start, therefore, a start gear suited for the uphill starting is automatically selected.

Furthermore, at S26 it is determined whether the trailer is towed or not in order to separately memorize a start gear of when the trailer is towed (S27) and that of when no trailer is towed (S28). Thus, when the tractor is started with the trailer, the start gear memorized for that situation is retrieved at S3 in FIG. 1, and when the tractor is started without the trailer, the start gear memorized for such situation is retrieved at S2 in FIG. 1. In this manner, an appropriate start gear is always selected.

What is claimed is:

1. An apparatus for use with a vehicle transmission including an actuator for shifting the transmission comprising:
   a sensor for detecting whether the vehicle tows another vehicle or not; and
   a controller for issuing a command to the actuator to control a shifting operation of the transmission, and for selecting one start gear from two predetermined start gears based on detection result from the sensor when starting the vehicle;
   wherein the sensor is a contact type or optical type switch mounted on the vehicle, and the another vehicle is mechanically coupled with the vehicle such that a certain portion of the another vehicle touches the switch when the another vehicle is towed by the vehicle, and the controller selects the one start gear from the two predetermined start gears based on turning off of the switch.

2. The apparatus according to claim 1, wherein the sensor determines whether the another vehicle is towed or not based on change in voltage or current of a signal issued to the another vehicle from the vehicle to illuminate a brake lamp of the another vehicle.

3. The apparatus according to claim 1, wherein the transmission has more than ten gear positions.

4. The apparatus according to claim 1, wherein the two predetermined start gears are fourth and ninth gears.

5. An apparatus for use with a vehicle transmission including an actuator for shifting the transmission comprising:
   a sensor for detecting whether the vehicle tows another vehicle or not; and
   a controller for issuing a command to the actuator to control a shifting operation of the transmission, and for selecting one start gear from two predetermined start gears based on detection result from the sensor when starting the vehicle;
   wherein the two predetermined start gears comprises a first start gear of when the another vehicle is towed and a second start gear of when the another vehicle is not towed, the controller learns a current gear as the first start gear or the second start gear based on detection result from the sensor when a vehicle speed is zero, a brake pedal is depressed, an accelerator pedal is not depressed, the vehicle is stopped over a prescribed period of time, and the transmission is in a neutral position.

6. The apparatus according to claim 5, wherein the sensor determines whether the another vehicle is towed or not based on change in voltage or current of a signal issued to the another vehicle from the vehicle to illuminate a brake lamp of the another vehicle.

7. The apparatus according to claim 5, wherein the transmission has more than ten gear positions.

8. The apparatus according to claim 5, wherein the two predetermined start gears are fourth and ninth gears.

9. An apparatus for use with a vehicle transmission including an actuator for shifting the transmission comprising:
   detecting means for detecting whether the vehicle tows another vehicle or not; and
   control means for issuing a command to the actuator to control a shifting operation of the transmission, and for selecting one start gear from two predetermined start gears based on detection result from the detecting means when starting the vehicle;
   wherein the detecting means is a contact type or optical type switch mounted on the vehicle, and the another vehicle is mechanically coupled with the vehicle such that a certain portion of the another vehicle touches the switch when the another vehicle is towed by the vehicle, and the control means selects the one start gear from the two predetermined start gears based on turning on and off of the switch.

10. The apparatus according to claim 9, wherein the detecting means determines whether the another vehicle is towed or not based on change in voltage or current of a signal issued to the another vehicle from the vehicle.

11. An apparatus for use with a vehicle transmission including an actuator for shifting the transmission comprising:
    detecting means for detecting whether the vehicle tows another vehicle or not; and
    control means for issuing a command to the actuator to control a shifting operation of the transmission, and for selecting one start gear from two predetermined start gears based on detection result from the detecting means when starting the vehicle;
    wherein the two predetermined start gears comprises a first start gear of when the another vehicle is towed and a second start gear of when the another vehicle is not towed, the control means learns a current gear as the first start gear or the second start gear based on detection result from the detecting means when a vehicle speed is zero, a brake pedal is depressed, an accelerator pedal is not depressed, the vehicle is stopped over a prescribed period of time, and the transmission is in a neutral position.

* * * * *

UNITED STATES PATENT AND TRADEMARK OFFICE
CERTIFICATE OF CORRECTION

PATENT NO. : 6,524,221 B2
DATED : February 25, 2003
INVENTOR(S) : Nobuyuki Nishimura It is certified that error appears in the above-identified patent and that said Letters Patent is hereby corrected as shown below:

<u>Title page,</u>
Item [57], ABSTRACT,
Line 2, the first "(306)" shoud read -- (303) --.
Line 3, "(306)" should read -- (303) --.

<u>Column 11,</u>
Line 19, -- on and -- should be inserted after "ing."

Signed and Sealed this

Fifth Day of August, 2003

JAMES E. ROGAN
*Director of the United States Patent and Trademark Office*